UNITED STATES PATENT OFFICE.

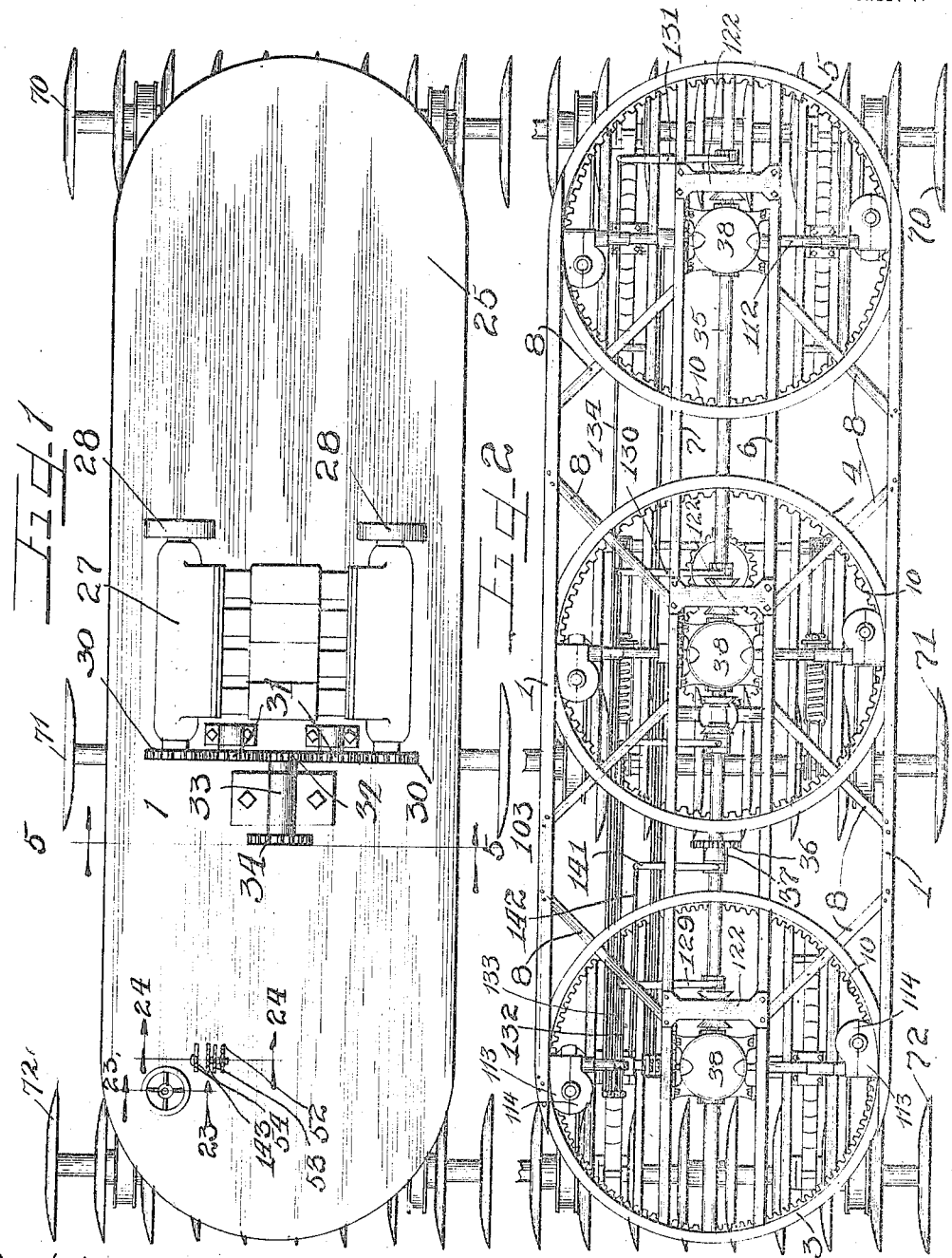

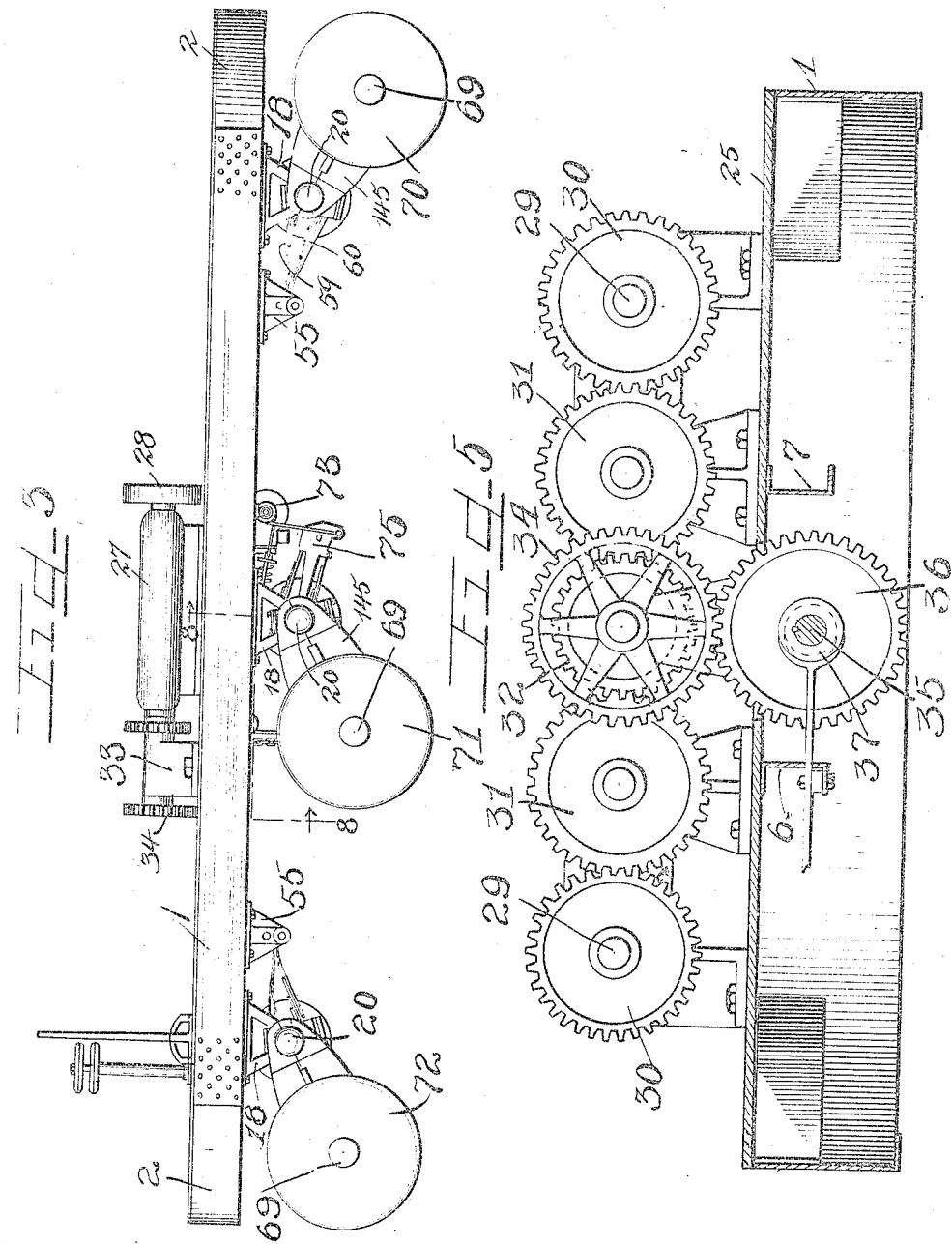

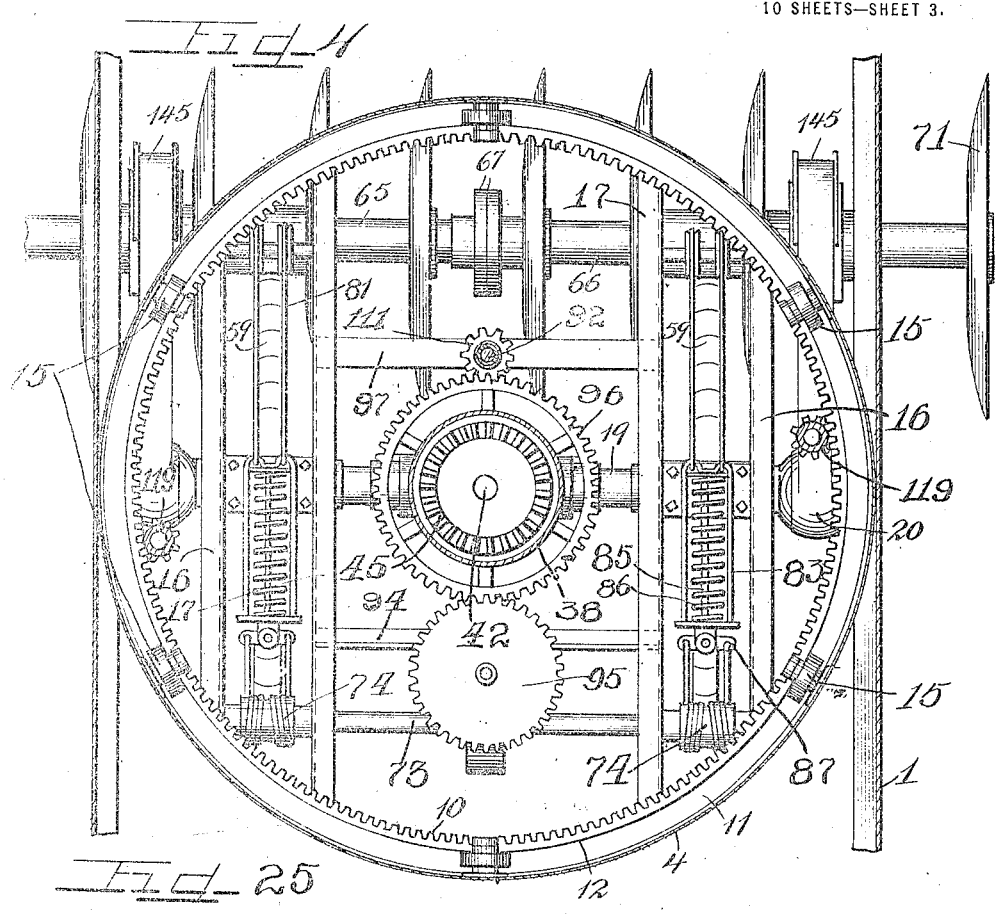

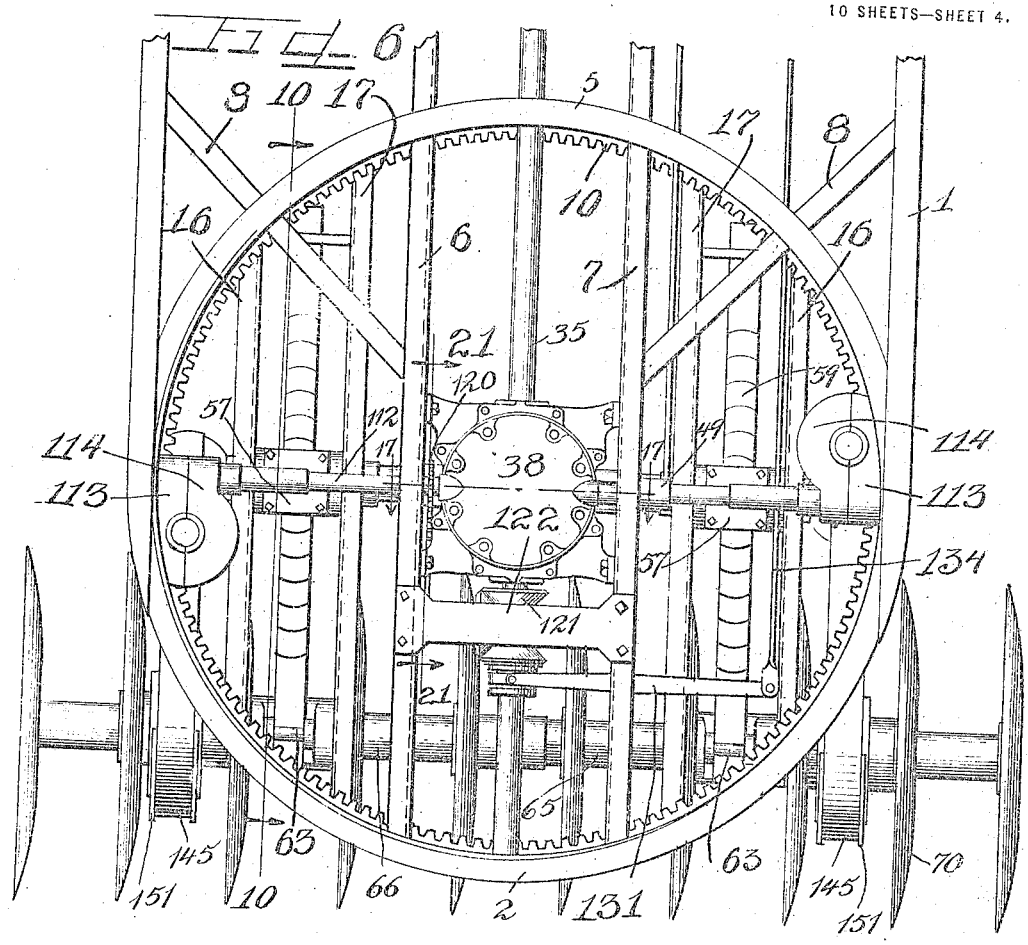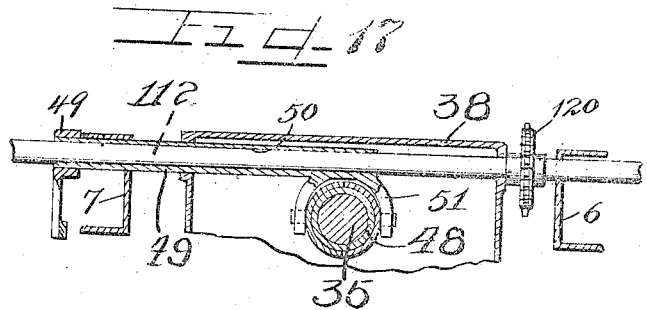

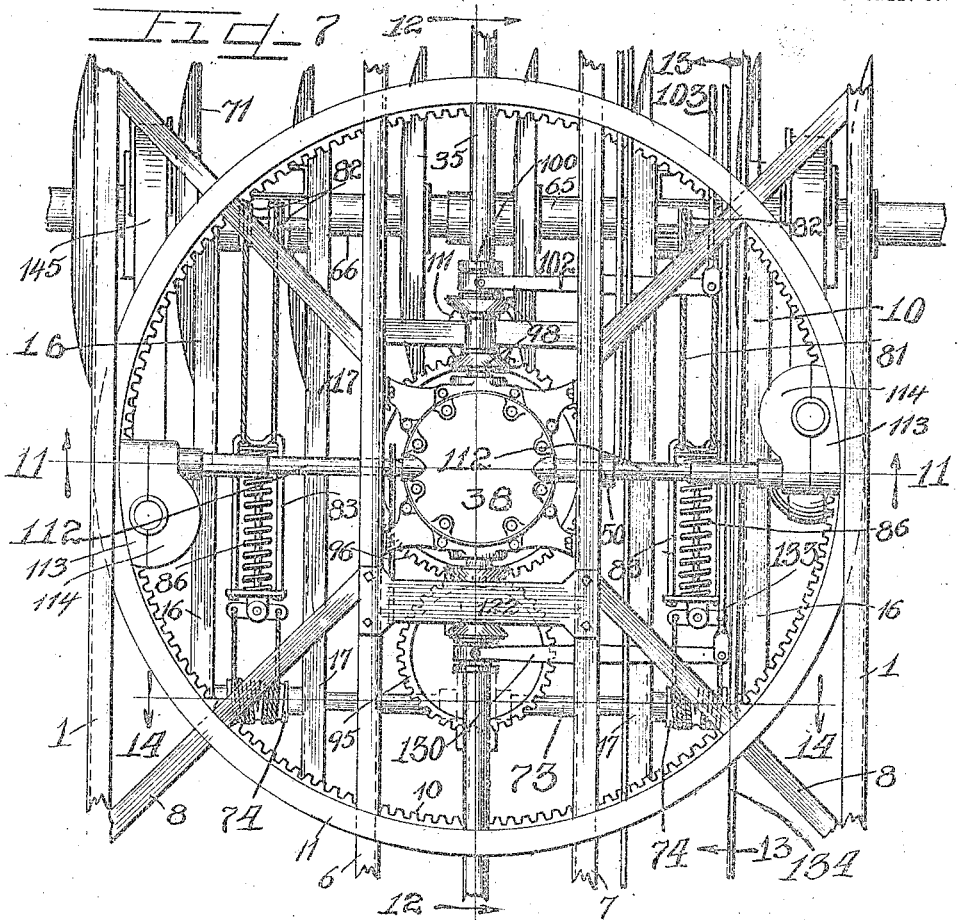
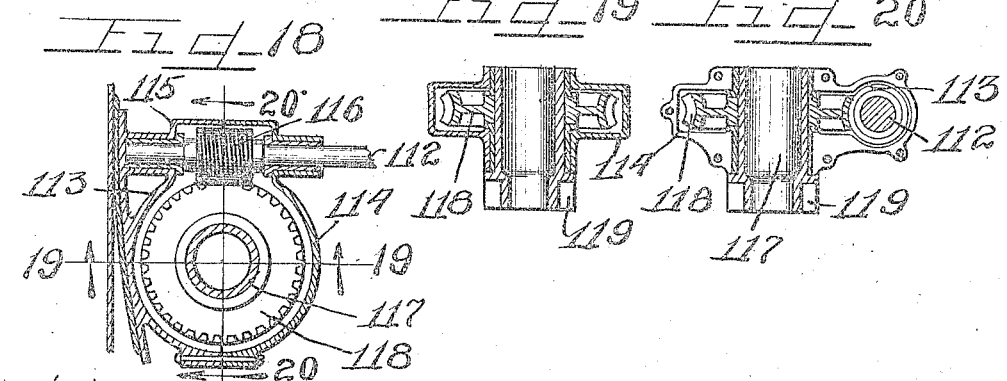

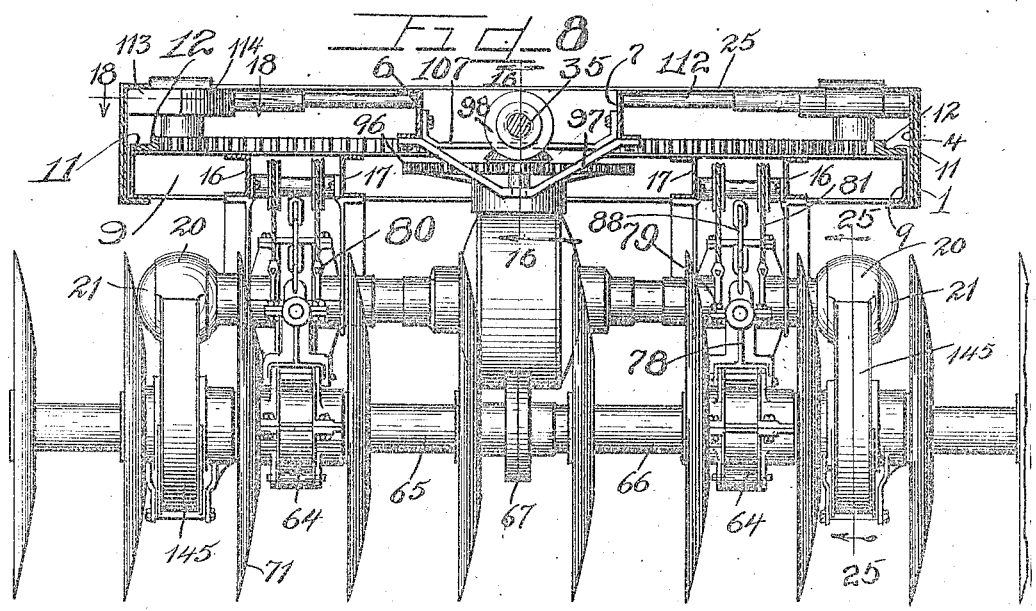
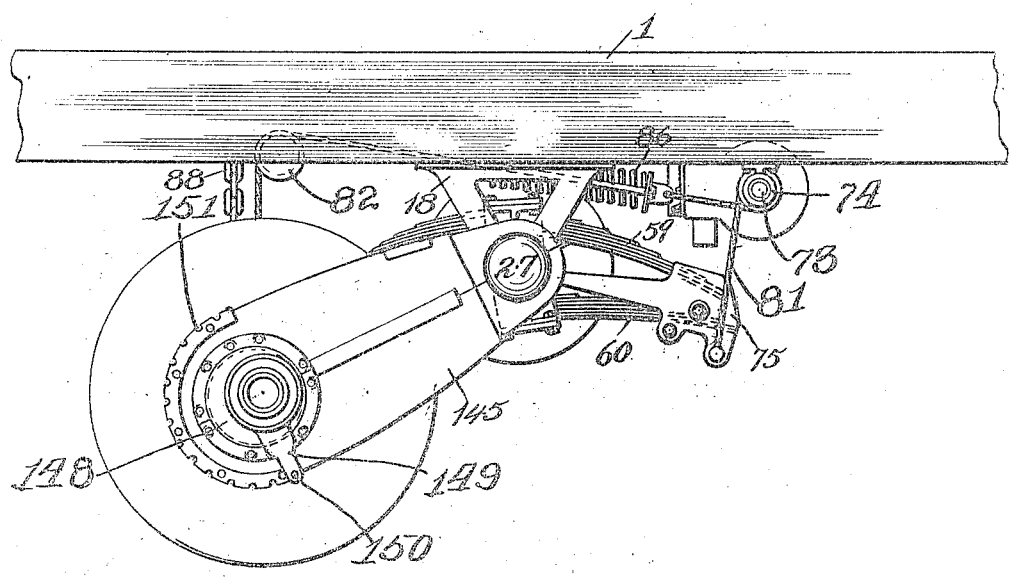

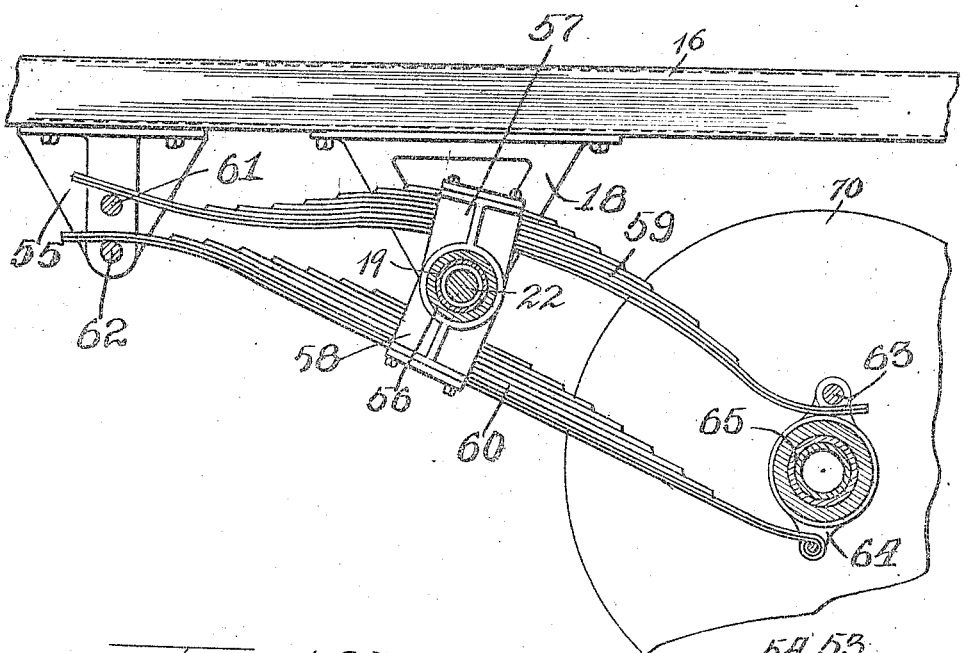
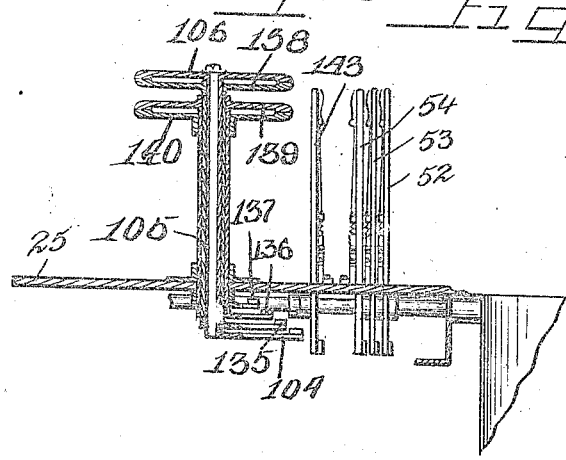
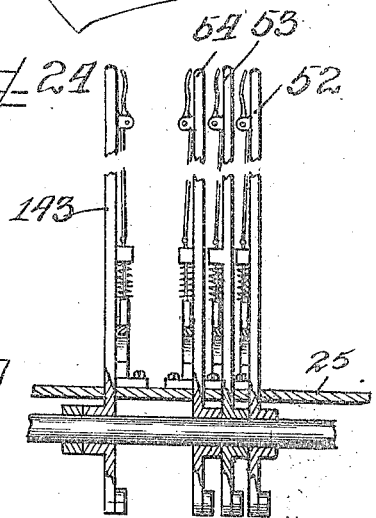

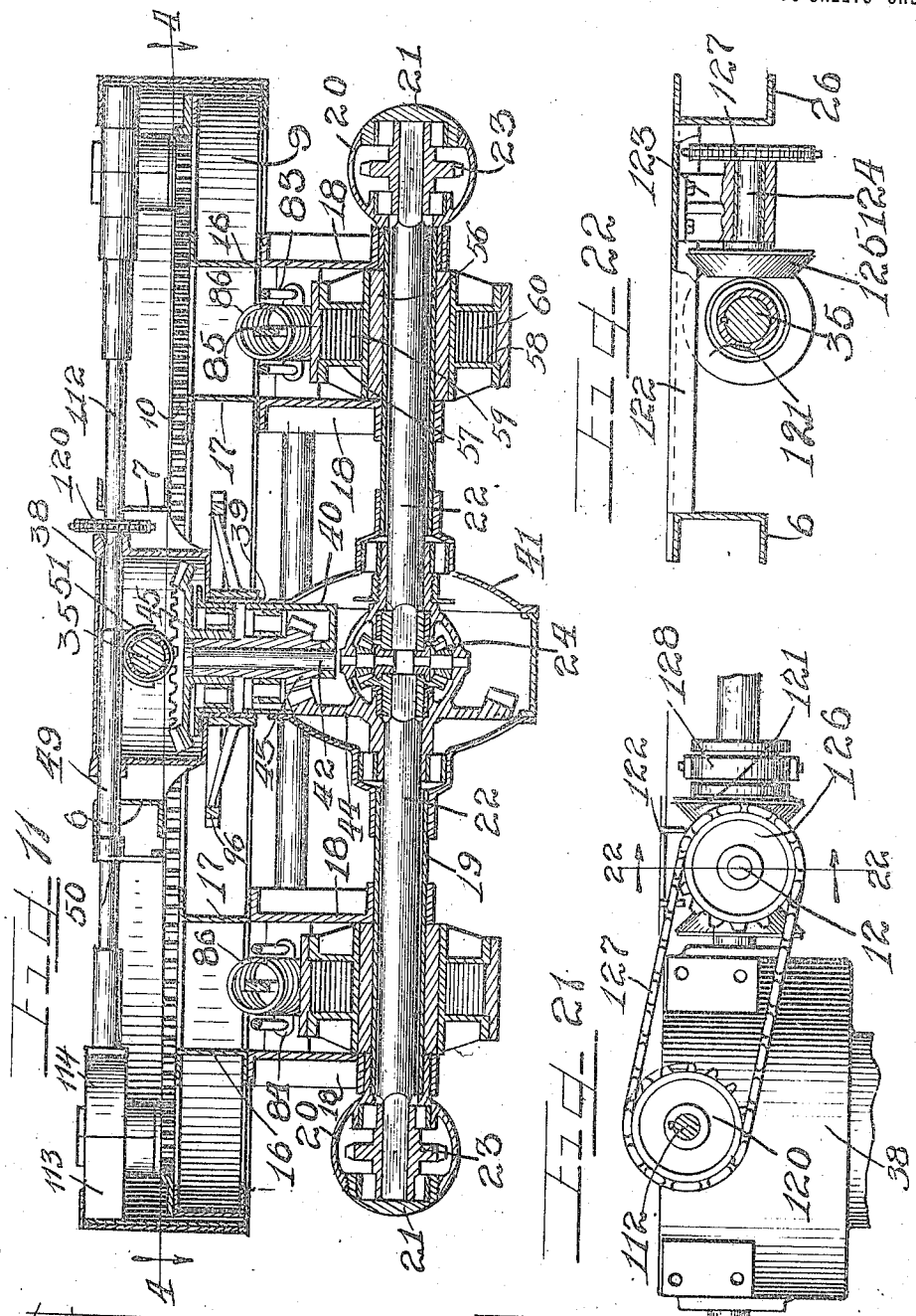

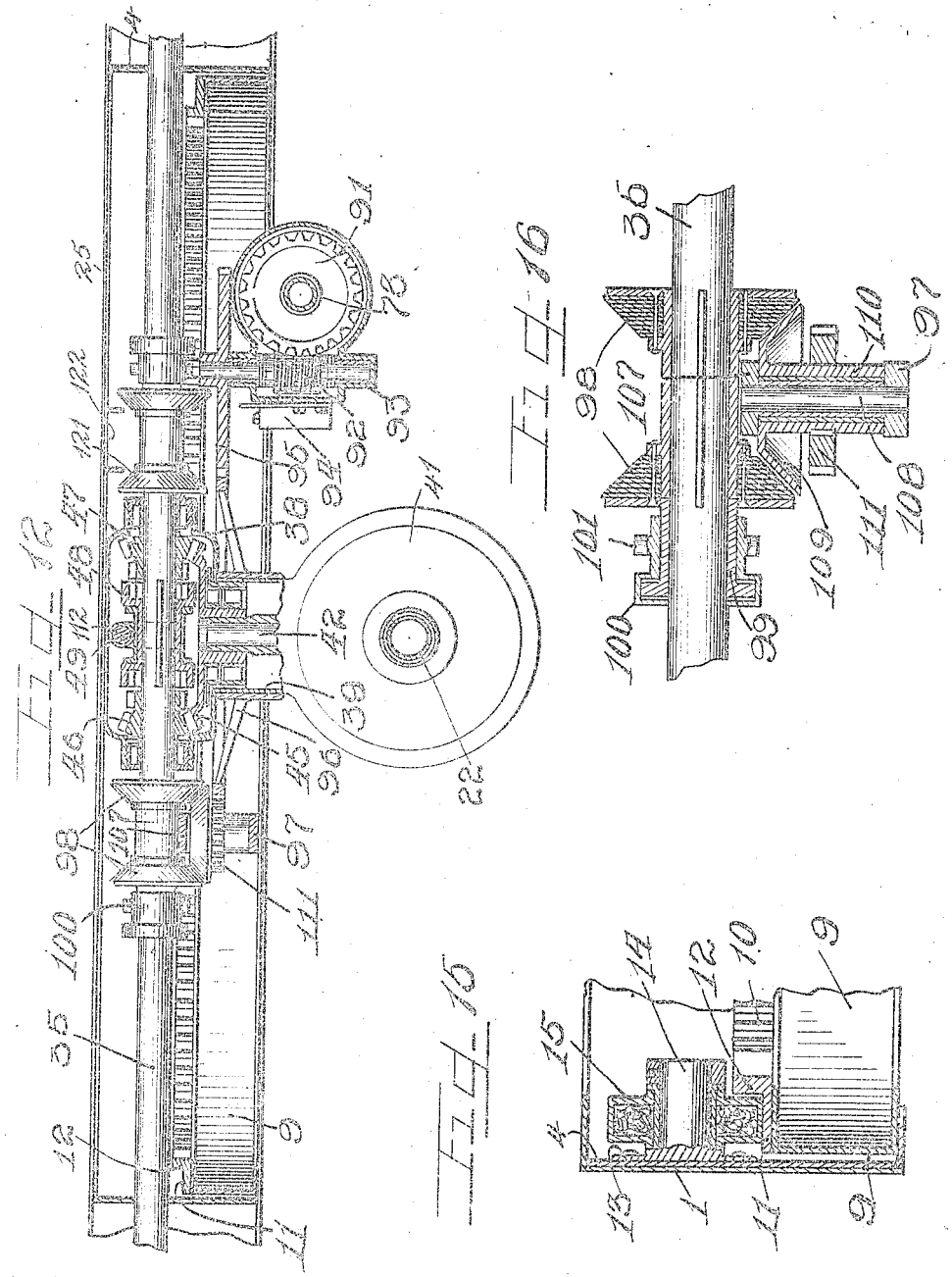

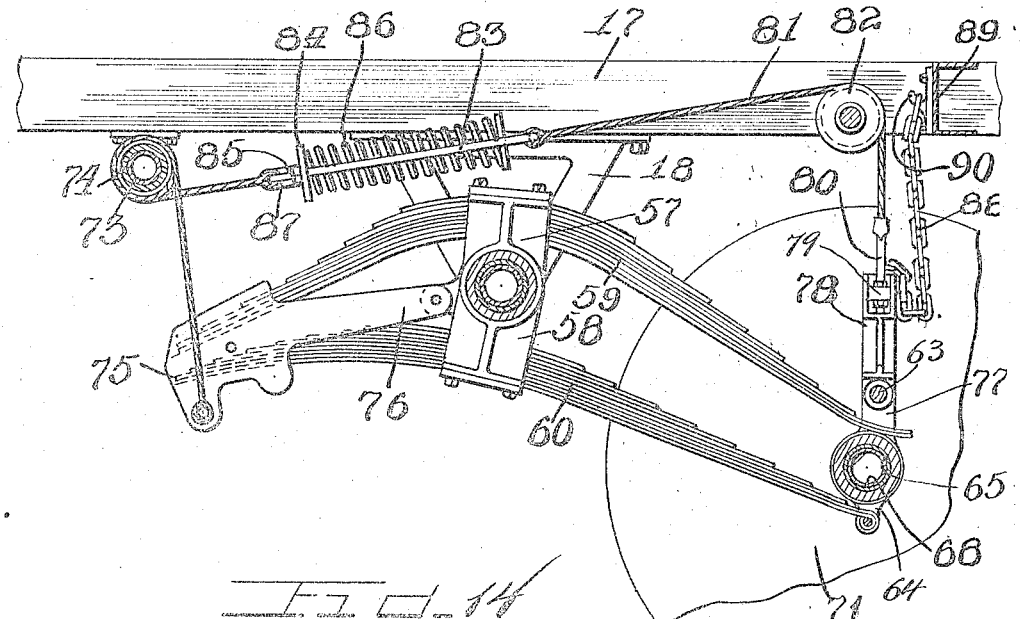
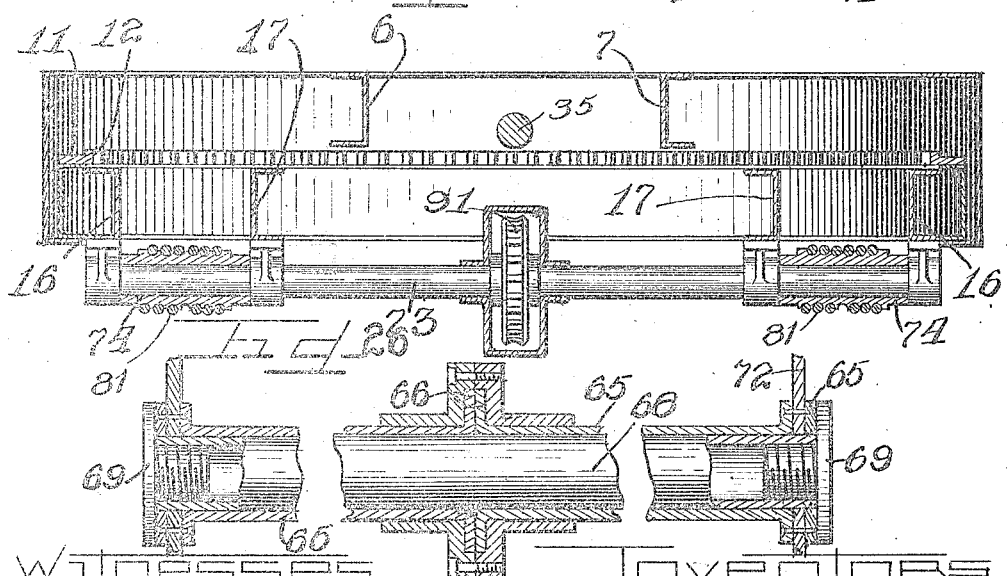

ALBERT E. COOK, OF ODEBOLT, IOWA, AND THOMAS VAN TUYL, OF KANKAKEE, ILLINOIS; SAID VAN TUYL ASSIGNOR TO SAID COOK.

MOTOR-PLOW.

1,180,477.  Specification of Letters Patent.  Patented Apr. 25, 1916.

Application filed September 6, 1912. Serial No. 718,802.

*To all whom it may concern:*

Be it known that we, ALBERT E. COOK and THOMAS VAN TUYL, citizens of the United States, and residents of the city of Odebolt, in the county of Sac and State of Iowa, and Kankakee, Kankakee county, Illinois, respectively, have invented certain new and useful Improvements in Motor-Plows; and we do hereby declare that the following is a full, clear, and exact description of the same, reference being had to the accompanying drawings, and to the numbers of reference marked thereon, which form a part of this specification.

This invention relates to improvements in motor plows of the class wherein the plowing, or at least a material part thereof, is accomplished by the centrally supported plowing means adapted for adjustment to vary the depth of the cut or the stirring of the soil, and wherein the mechanism as a whole embraces suitable propelling and tractive means which also may serve to stir or cultivate the soil, and upon and between which the main plowing means are supported to permit adjustment as to depth of the cut.

It is also an object of the invention to afford a construction whereby the machine may be driven with equal facility in either direction, or, if preferred, obliquely, thereby obviating the necessity of turning the machine at corners.

It is a further object of the invention to afford a spring suspension whereby the machine is relieved from the major portion of the stresses occasioned by inequalities of surface.

It is finally an object of the invention to afford an exceedingly powerful and efficient machine for the purpose specified, and yet of simple construction, and adapted to be operated by one having but little previous experience.

The invention (in a preferred form) is illustrated in the drawings, and hereinafter more fully described.

In the drawings: Figure 1 is a top plan view of a device embodying our invention. Fig. 2 is a similar view with the deck and engine removed, and with parts broken away. Fig. 3 is a side elevation. Fig. 4 is a section on line 4—4 of Fig. 11. Fig. 5 is an enlarged fragmentary section taken on line 5—5 of Fig. 1. Fig. 6 is an enlarged, fragmentary, plan view of the forward end of the machine with the deck omitted. Fig. 7 is a similar view of the central portion of the machine, with the deck omitted. Fig. 8 is a detail section with parts omitted, on line 8—8 of Fig. 3, illustrating a part of the adjusting means for the central plowing elements. Fig. 9 is an enlarged fragmentary side elevation illustrating the suspension and operation of the central or main plowing means. Fig. 10 is an enlarged fragmentary sectional detail on line 10—10 of Fig. 6. Fig. 11 is an enlarged, transverse section taken on line 11—11 of Fig. 7. Fig. 12 is an enlarged, fragmentary detail section with parts omitted, taken on line 12—12 of Fig. 7. Fig. 13 is an enlarged section taken on line 13—13 of Fig. 7. Fig. 14 is an enlarged detail section on line 14—14 of Fig. 7. Fig. 15 is an enlarged, fragmentary, transverse section taken through the frame, one of the main internal gears wheels, and the roller therefor. Fig. 16 is an enlarged section on line 16—16 of Fig. 8. Fig. 17 is an enlarged section on line 17—17 of Fig. 6. Fig. 18 is a section on line 18—18 of Fig. 8, and illustrates the worm gear drive for rotating the plow frames horizontally. Fig. 19 is a section on line 19—19 of Fig. 18. Fig. 20 is a section on line 20—20 of Fig. 18. Fig. 21 is an enlarged section taken on line 21—21 of Fig. 6. Fig. 22 is a section taken on line 22—22 of Fig. 21. Fig. 23 is an enlarged, fragmentary detail section of the steering and operating mechanism, taken on line 23—23 of Fig. 1. Fig. 24 is a similar sectional view of the operating levers, as shown on line 24—24 of Fig. 1. Fig. 25 is an enlarged, sectional view on line 25—25 of Fig. 8. Fig. 26 is a central longitudinal section of any of the disk shafts.

As shown in the drawings, parallel side frame members 1, each comprising an inwardly facing broad webbed angle bar, are rigidly connected at their ends and intermediate their ends, by circle frames 2, as shown in Figs. 2, 3, and 11. Said circle frames comprise each annular frame members 3, 4, and 5, each constructed of an inwardly facing angle bar or bars, having flanges at the top, and having a width of web to fit within said sills 1, and rigidly secured thereto by means of bolts or rivets. Extending longitudinally the machine, one on each side the middle, and in parallel relation, are center sills 6 and 7, which are shown as channel bars, having much less width of web than the sills and circle frames, and, as shown, extending from end to end of the machine and through the webs of the circle frames near the top thereof, and rigidly secured thereto by riveting through the upper flanges of each. Diagonal braces 8, extending from said side sills obliquely, forwardly, and rearwardly, at an angle of approximately 45°, are rigidly secured to center sills within said circle frames, the line of direction of said braces preferably being such as to pass through the center of said circle frames. Any suitable or convenient means may be employed for engaging the braces in place. Preferably, however, the same pass through suitable apertures in the respective webs of the respective circle frames, and are rigidly secured by riveting, bolting, or welding thereto, and to the respective sills.

Within each circle frame below the center sills and braces before described, is rotatably mounted a revolubly circular carriage 9, constructed of channel bars, the flanges of which are directed inwardly, and rigidly secured flat upon the upper flange of each, is an internally geared rim 10, which, as shown, is reduced in thickness from a point adjacent the gear teeth to the periphery, affording a flat bearing face 11, adjacent the periphery, and an upstanding wall or rib 12, facing outwardly, as shown more clearly in Fig. 15.

Brackets 13, are rigidly bolted to the circle frame above each of said carriages and gear wheels, and integral with which is an integral projecting stud shaft 14, on which is journaled a roller 15, against which the peripheral flat tread surface of the gear bears upwardly, and against the inner face of which the outwardly facing upright wall or shoulder 12, of the gear bears outwardly. Rigidly secured on each of said revolving carriages and extending longitudinally of the machine, are parallel beams 16 and 17, which are arranged in pairs on each side of the center of said carriages, and as shown in Fig. 11, consist of channel bars fitted into said revolving carriages and in the same plane therewith. Rigidly secured on said beams are downwardly extending brackets 18, arranged in alinement, and through which extends a bearing sleeve 19, for the driving axle. Fitted upon the outer end is an enlarged casing 20, as shown in Figs. 3 and 11, substantially spherical in form, and in the outer face of which a removable cap or plug 21, is screwed to afford access to the interior of the axis thereof. Journaled within said sleeve are the alined axle sections 22, the outer end of each of which is angular, and on which is secured a driving sprocket wheel 23. Secured on, and connecting the inner ends of said shaft sections is a differential gearing, indicated as a whole by 24, and which may be any familiar type of differential gear to permit independent or differential action of the shaft sections, and hence requires no description.

Mounted on the deck 25, of the machine, is an engine, shown as an internal combustion engine 27, which may be a multiple cylinder opposed engine, or any device capable of furnishing power for the machine, but, as shown, a center compression multiple cylinder opposed engine, having balance wheels 28, at one end of each of its crank shafts 29, and gear wheels 30, at the other. Said gear wheels mesh with the idle gear wheels 31, which in turn mesh with a gear wheel 32, secured upon a shaft journaled in a bracket or bearing 33, secured on the deck of the machine. The opposite end of said shaft is provided with a gear wheel 34, of somewhat larger size.

Extending centrally and longitudinally of the main frame, and journaled on said frame and in the ring frames, and above the carriage and the gear thereon, is a main shaft 35, and rotatably mounted thereon is a gear wheel 36, as shown in Fig. 5, and adapted to be engaged thereto by means of a clutch 37, slidably engaged on said shaft, as shown in Fig. 2. Said shaft at or near the center of each of said circle frames, passes through a gear casing 38, which is rigidly secured at the center of each carriage by bolting to the sills 6 and 7. Said gear casing is provided with a central, downwardly directed sleeve 39, into which a bracket sleeve 40, fits, as shown in Fig. 11, and which is rigidly secured by bolting or otherwise, to the differential casing 41, for said shaft.

A vertical shaft 42, is journaled at its lower end in said bracket 40, and is provided with a bevel gear 43, which meshes with the large bevel driving gear 44, for the differential, and rigidly secured on the upwardly directed, elongated hub of the pinion 43, is an upwardly facing bevel gear 45. Rotatably mounted upon said main driving shaft 35, are bevel pinions 46 and 47, which mesh with opposite sides of the bevel gear 45, to permit said bevel gear to be driven in either direction, and a double ended clutch member 48, is splined upon said shaft and adapted to engage the complemental clutch member afforded by the hubs of said pinions, as shown in Fig. 12.

Extending laterally through the gear casing 38, above the shaft 35, is a tubular shaft 49, provided with a crank arm 50, at its outer end, and at its inner end provided with a yoke 51, which engages the said double ended clutch 48, to shift the same longitudinally of the main driving shaft to engage either end of said clutch with the corresponding driving pinion, and, as shown, shifting levers 52, 53, and 54, each provided with a detent and segment, are mounted upon the deck of the machine at operative position, and operatively connected with the respective crank arms 50, on said tubular shafts 49, to permit the clutches in said respective circle frames to be adjusted at the will of the operator.

Depending from the beams 16 and 17, at the rear and at the forward sides respectively of the front and rear circle frames, are parallel brackets 55, and mounted on the sleeve for the differential shaft between the brackets 18, therefor, as shown in Fig. 10, is a sleeve 56, on which are mounted integrally connected upwardly and downwardly directed spring brackets or yokes 57 and 58, in which are rigidly engaged at their middle, the upper spring 59, and the lower spring 60, the upper ends of which extend over the rounded bars 61 and 62, respectively, arranged one above the other and extending transversely through the respective pairs of brackets 55, therefor. The lower ends of said springs are engaged in upper and lower spring clamps 63 and 64, and journaled in which are the tubular disk shaft sections 65, which, as shown, are provided with peripheral flanges 66, at their inner abutting ends, as shown in Fig. 26, and which are engaged together by means of a centrally divided annular housing 67, comprising members bolted to inclose said flanges, but to permit free simultaneous or independent rotation thereof. Extending through said tubular shaft 65, is an inner tubular shaft 68, which extends for the entire length thereof, and is provided with flanged nuts 69, threaded thereinto, and which bear against the outer ends of said tubular shaft sections 65, and together with the construction before described, sustains any transverse stresses to which the disk shafts may be subjected.

Rigidly secured on the sectional disk shafts 65, on each side of the center thereof, and preferably spaced equal distances apart, are relatively thin concaved plowing disks of large diameter, indicated on the respective shafts for convenience by 70, 71, and 72, although said disk may or may not be identical in form, size and construction as preferred. Said disks support the machine and afford the tractive means therefor as well as the soil stirring or plowing means.

As shown, the central gang of disks 71, or that mounted upon the central circle frame, is so connected with its circle frame as to permit the depth of cut thereof to be varied at the will of the operator. For this purpose, a winch shaft 73, is journaled below the circle frame on the beams 16 and 17, before described, on said central circle frame, corresponding in position with the brackets 55, before described, on the front and rear circle frame, and secured on each end thereof between said beams is a grooved drum 74, as shown in Figs. 4, 7, and 14. A suitable housing 75, is secured on the upper end of the springs 59 and 60, below said circle frame, and provided with arms 76, which extend to, and are pivotally connected with the spring clamps 57 and 58, to hold said housing in place. The spring clamp 77, on said disk shaft for the lower end of said springs, is constructed as before described with reference to the spring clamps 63 and 64, except that an integral arm 78, extends upwardly therefrom and is provided with a transverse head 79, connected with each end of which is an eye bolt or cable stop 80, to which is engaged the cables 81, which extend over idle sheaves 82, suitably journaled between the beams 16 and 17, and thence lead downwardly a plurality of times around the drums 74, on the winch shaft 73. The ends thereof are connected on said housing 75, as shown in Figs. 9 and 13. Preferably a spring tension device is connected in said cable between the sheaves 82, and drums 74. For this purpose, each of said cables is constructed in two parts, and the ends thereof between said sheaves and drum are connected respectively upon a yoke 83, the parallel arms of which are directed toward the drums, and are connected at their extremities by a central apertured plate 84, through which extends a bar 85, on which, within said yoke, is engaged a strong spiral spring 86, one end of which is engaged on the inner end of said bar, and the other end of which bears against said plate 84, as shown in Fig. 4. Said bar is provided at its outer end with an equalizing transverse head 87, with which the other ends of said cables (or those directed around the drums) are connected, so that a yielding tension is at all times exerted on the cables intermediate said sheaves and drum. As shown also, a chain 88, is connected with a transverse beam 89, on the circle frame, and at its lower end is connected with said arm 79, and serves to limit the downward adjustment of said disk gangs, such limit, however, being capable of variation by shifting the engagement of the chain on the hook or finger 90, engaged on said beam, and which, of course, may engage in any of the links of said chain.

Centrally secured on the winch shaft 73, is a worm gear 91, and meshing therewith is a vertical worm shaft 92, which is journaled in bearings 93, carried upon a beam 94, secured on the longitudinal beams 17, of the circle frame. Rigidly secured on the upper end of said worm shaft is a gear wheel 95, which meshes with an idle gear wheel 96, rotatably secured upon the stem or sleeve of the gear casing 39. At the opposite side of the gear casing a beam 97, is secured transversely on said beams 6 and 7, of the main frame, and splined to slide upon the main driving shaft 35, and directly above said beams, are two inwardly facing bevel friction wheels 98, as shown in Fig. 16, which are rigidly connected together, and provided at one end thereof with a flanged hub 99, about which is engaged a sleeve 100, having a recess therein for said flange, and which is provided with oppositely directed pins or lugs 101, to receive the yoke of a shifting lever 102, shown in Fig. 7. A rod 103, is connected with the extremity of said lever, the end of which is engaged on a crank arm 104, secured to a shaft 105, which is provided with a hand wheel 106, for rotating the same, and acts to slide the friction wheels upon the shaft. Also connected with the longitudinal beams 6 and 7, and above the beam 97, is a transverse beam 107, and journaled therein is a shaft 108, having a bevel friction gear 109, thereon, which projects upwardly between the bevel friction wheels 98, and is adapted to be engaged by either. Rigidly secured on the elongated hub 110, thereof, is a pinion 111, as shown in Figs. 12 and 16, which meshes with the gear wheel 96. This construction permits the winch shaft to be rotated in either direction by means of the driving shaft, the direction, of course, being dependent upon which (if either) of the bevel frictions 98, are engaged.

Means are provided for rotating the revoluble carriages in the respective circle frames independently. For this purpose, shafts 112, extend transversely each of said circle frames directly above said rotatable carriages and extend through the tubular shafts 49. Rigidly secured on each side of each circle frame, is a bracket 113, having a casing 114, rigidly secured thereon, and which communicates with a casing 115, in which the ends of said shafts 112, are journaled, and in which is provided a worm 116. Journaled centrally in the casing 114, is an upright tubular shaft 117, upon the upper end of which, within said casing, is provided a worm gear 118, which meshes with said worm and on the lower end of which is secured a pinion 119, which meshes with the gear wheel 10, secured upon the rotatable carriage. Rigidly secured on said shaft 112, adjacent the central gear casing, is a sprocket wheel 120.

Splined upon the driving shaft 35, in each of said revoluble carriages, is a double, inwardly facing bevel friction wheel 121, and extending transversely the beams 6 and 7, above the same, is a beam 122, secured on which is a downwardly directed bracket 123, in which is journaled a shaft 124, extending at a right angle with the main driving shaft in each of said carriages, and having rigidly secured on one end thereof a bevel friction 125, which projects between said bevel friction wheels 121, and is adapted to be engaged by either.

At the opposite end of said shaft is provided a sprocket wheel 126, and a chain 127, is trained about the same in each of said revolving carriages, and about the sprocket wheel 120, on the shaft 112. A suitable yoke 128, is engaged on the hub of the double friction wheel 121, on the main driving shaft, to slide the same in either direction thereon, so that either may engage the bevel friction 125, thereby rotating the carriage therefor in either direction, dependent upon the friction wheel engaged.

The levers, indicated by 129, 130, and 131, for the respective carriages, are connected by means of rods 132, 133, and 134, with the crank arms 135, 136 and 137, each secured upon a rotative upright shaft concentric with the shaft 105, and adapted to be actuated by the hand wheels 138, 139 and 140, to admit of adjusting said carriages by the rotation thereof independently. As shown, the main clutch 37, for the main driving gear 36, or that whereby the power of the engine is communicated to the main driving shaft 35, is actuated by a lever 141, as shown in Fig. 2, which is connected by means of a rod 142, with an actuating lever 143, provided with a segment and detent in a familiar manner, as shown in Figs. 23 and 24.

As shown, a metallic casing 145, incloses the sprocket wheels 23, on the respective differential shafts, and the sprocket wheels 146, complemental therewith, secured on the shaft 65, for each gang of disks, as well as the sprocket chains 147, therefor, and a bearing member 148, is journaled centrally in the end of said casing, and the disk shaft 65, is eccentrically journaled in each of said bearing members, as shown in Fig. 9. A lever 149, is engaged on said bearing member, and is provided with a detent 150, adapted to engage in a notched segment 151, to hold said bearing member in adjusted position, so that said casings serve in lieu of distance rods and by means thereof the tension of the driving chains 147, may be adjusted as desired.

The operation is as follows: The drive of the engine is delivered to the driving shaft 35, through the medium of the gear wheel 34, which meshes directly with the gear wheel 36, on said main shaft, and which is engaged thereto by means of a clutch 37, to drive said shaft always in the same direction. Through the medium of the gear train within the casing 38, and differential gearing, including the double ended clutch 48, (the construction being the same, or substantially the same for each of the carriages) the drive of said shaft 35, is communicated to the differential shafts, and thence to the disk shafts to drive the machine in either direction at will, so that the machine may be operated in either direction with equal facility. When upon the road, the respective disk shafts are adjusted at right angles with the main frame and serve merely as traction wheels to carry the machine, and do not cut deeply into the surface. When at work, however, as a plowing or cultivating tool, the disk shafts are adjusted obliquely with the main frame, the obliquity thereof varying with the character of the work to be performed, including the depth of cut. Conveniently, the disks at the forward and the rear end of the machine, are directed in one direction on their shafts, and the central disks oppositely, so that the cut or thrust of the central gangs of disks serves to a degree to balance the cut or thrust of those at the ends of the machine, and if desired, the front and rear disks (which serve mainly as supporting and traction means) may be set to afford a comparatively shallow cut, while the intermediate or central disks may be adjusted by means of the winch shaft before described, to cut at a lower depth for deep plowing, or, if desired, the disks at the forward end of the machine (dependent upon the direction of travel of the machine) may be set as trash cutters, and for that purpose may be provided with corrugated edges, if desired. The central disks may be adjusted for deep plowing, and the rear set of disks adjusted to again turn the soil, but more lightly or of less depth than the central plows. If desired, a gang of plow bottoms may be substituted in lieu of the central disks, and conveniently supported to vary the depth of cut thereof independently of the front and rear traction wheels or disks.

Owing to the spring suspension described, the machine follows easily and readily over all surface inequalities, and effectively stirs, turns, and agitates the soil at the required depth. Owing to the differential action afforded by the differential driving shaft, and inasmuch as the disk shafts are sectionally constructed, the machine operates perfectly on turns, the turning, of course, being effected by the relative adjustment of the various gang disks obliquely with the main frame. Instead of turning the machine, however, the machine may be moved laterally by properly adjusting the disks and by reversing the drive may move back and forth across a field, thereby saving the time otherwise required for the furrows.

Of course, it is to be understood that in such matters as the particular differential gearing employed, and the particular transmission devices used, conventional constructions have been mainly shown. These may, of course, be varied to suit the requirements of the particular machine. We have shown but a preferred construction embodying our invention, and we do not purpose limiting the patent granted thereon otherwise than necessitated by the prior art.

We claim as our invention:

1. In a device of the class described a platform, a plurality of turntables mounted therebeneath, one at each end and one at the middle of the device with the centers of each disposed along the longitudinal axis of said device, annular gears forming a part of said turntables, a power plant mounted on the main frame, connections therewith to drive to said annular gears to turn said turntables, rotatable plows mounted beneath said turntables and connected thereto and offset from the center thereof, and driving connections for rotating said plows to advance the device.

2. In a device of the class described a main frame, a power plant supported thereon, a plurality of turntables connected beneath said frame to support the same, and all in longitudinal alinement with one another, with one turntable disposed intermediate the ends of the device, driving connections between said turntables and said power plant to rotate said turntables by power, gangs of rotatable plows mounted beneath each of said turntables and offset from the center thereof, a resilient connection between said gangs of plows and the respective turntables, and driving connections between said plows and said power plant whereby said plows may be rotated.

3. In an automobile agricultural implement a body, rotative elements at each end thereof, another similarly constructed element at the middle of the body and in longitudinal alinement with said end elements, one of said elements adapted to propel the machine and one of which is adapted for use in steering, mechanisms for actuating the same, means yieldingly supporting said body thereon, spring supported plowing elements carried on the body intermediate the ends thereof, and mechanism for adjusting the same to regulate the depth of cut thereof.

4. In a machine of the class described, a body, a shaft journaled longitudinally therein, an engine mounted on the body to drive said shaft, a horizontally rotatable carriage journaled at one end of the machine, a rotative shaft having a plurality of closely arranged large size plowing disks thereon yieldingly secured to the carriage and acting to support said end of the machine, operative connections between the driving shaft and gang shaft to rotate the same to propel the machine thereby, supporting and steering means at the other end of the machine, yieldingly supported power driven plowing means carried on the frame near the middle thereof, and mechanism for adjusting the same on said body to vary the depth of cut or to support the same above the cut.

5. In a machine of the class described a main frame, front and rear supporting, steering and propelling plowing means, a main driving shaft, means operated thereby for rotating said propelling means, means for adjusting said propelling and steering means beneath the main frame in steering, central and yieldingly supported plowing means similar in construction to said front and rear plowing means, and power operated means adjusting the same vertically with reference to the main frame and horizontally with reference to the main frame.

6. In a machine of the class described a platform or body, a motor thereon, a shaft driven thereby, a revoluble carriage at each end of the machine, and one intermediate the ends, a shaft extending transversely each carriage beneath the same, springs yieldingly connecting the same with the carriage, concave disks of large diameter rigidly secured on said shafts at short intervals apart, operative connections with the main shaft for driving said disk shafts in plowing, individual clutches and driving connections for rotating said carriages and the disks thereon horizontally beneath the frame, power operated means for projecting the central disk shaft downwardly to vary the cut thereof, and adjustable spring tension means for yieldingly holding said central disk shaft to its adjusted position.

7. In a device of the class described a body, turntables mounted at each end thereof and intermediate the ends and all in longitudinal alinement along the central longitudinal axis of said body, a power plant mounted on said body, connections between the same and each of said turntables to operate the same independently of one another, and a pair of plow disk gangs mounted beneath each of said turntables, each of said gangs driven independently of the others and each pair adjustable with the respective turntable to which said pair is connected.

8. In a machine of the class described a body, rotative traction and steering means at the opposite ends thereof, means yieldingly supporting the body thereon, a motor on the body, a shaft driven thereby and operatively connected to drive said propelling and steering means, a turntable adapted to be turned by power from said motor supported upon the body intermediate the ends thereof, plowing means yieldably mounted on said turntable, power operated means for vertically adjusting the same thereon to vary the cut, power operated mechanism for horizontally adjusting the same to vary the angle of cut, and reversing mechanisms adapting said machine to operate with equal facility in either direction and laterally.

9. In a machine of the class described embracing a body, a rotative carriage at each end thereof and one intermediate the ends all similarly constructed, a gang of concave disks of large diameter beneath each carriage, means yieldingly connecting the carriage thereon to support said body, mechanism for adjusting one of said gangs of disks vertically independently of the others, independent mechanisms for varying the angularity of said gangs of disks with reference to the main frame of the body independently, independent driving connections for each of said gangs of disks, and mechanisms for independently reversing the drives of said disks.

10. In a machine of the class described a main frame, three rotative carriages journaled therebeneath and arranged respectively at each end and at the middle of said main frame, a rotative gang shaft yieldingly engaged with, and supporting said carriages and of a length greater than the width of the machine and offset from the center of each of said carriages, concave plowing disks of large size secured thereon, power connections for rotating said gang shafts and disks to propel the machine, and power operated mechanism for rotating the respective carriages to adjust said gangs of disks relatively the main frame to permit of propelling the machine longitudinally of the main frame or propelling the same laterally of the main frame in said latter adjustment, two of said gang disks capable of being swung beneath one side of the main frame and slightly out of alinement therewith, and the other of said gangs capable of being swung oppositely and beneath the other side of the main frame and slightly out of alinement therewith, to permit the machine to operate for substantially the entire length thereof in plowing or turning the soil.

11. In a device of the class described a frame, a power plant thereon, turntables supporting said frame at each end thereof, a turntable journaled beneath said frame intermediate the ends thereof, brackets secured on said turntables, a countershaft journaled diametrically beneath said turntables and adapted to be driven from said power plant, springs engaged in said brackets and bearing on said countershaft, and a plurality of gang plows journaled at the ends of said springs and connected to be driven by said driven countershafts.

12. In a device of the class described a frame, a power plant thereon, a plurality of turntables journaled beneath said frame to support the same, a differential drive shaft journaled diametrically on said turntables, connections to drive the same from said power plant, gang plows journaled beneath said turntables and offset from the center thereof, means maintaining the same in parallel relation with said countershafts, driving connections between said gang plows and said countershafts, and springs connected on said turntables and engaging said countershafts and said gang plows to resiliently support said turntables on said plows.

In testimony whereof we have hereunto subscribed our names in the presence of two subscribing witnesses.

ALBERT E. COOK.
THOMAS VAN TUYL.

Witnesses:
CHARLES W. HILLS, Jr.,
GEORGE R. MOORE.